(12) United States Patent
Hao et al.

(10) Patent No.: US 8,498,226 B2
(45) Date of Patent: Jul. 30, 2013

(54) METHOD FOR DETERMINING RANDOM ACCESS CHANNEL NUMBER AND SENDING SOUNDING REFERENCE SIGNAL

(75) Inventors: Peng Hao, Shenzhen (CN); Bo Dai, Shenzhen (CN); Chunli Liang, Shenzhen (CN); Bin Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 200 days.

(21) Appl. No.: 13/119,460

(22) PCT Filed: Aug. 5, 2009

(86) PCT No.: PCT/CN2009/000882
§ 371 (c)(1),
(2), (4) Date: Mar. 17, 2011

(87) PCT Pub. No.: WO2010/037246
PCT Pub. Date: Apr. 8, 2010

(65) Prior Publication Data
US 2011/0170462 A1 Jul. 14, 2011

(30) Foreign Application Priority Data
Sep. 28, 2008 (CN) .......................... 2008 1 0168483

(51) Int. Cl.
*H04J 3/00* (2006.01)
(52) U.S. Cl.
USPC ............................ 370/280; 370/294; 370/329
(58) Field of Classification Search
USPC ................. 370/203, 280, 328, 347, 350, 329, 370/330, 294; 375/133, 267
See application file for complete search history.

(56) References Cited

U.S. PATENT DOCUMENTS

| | | | |
|---|---|---|---|
| 2003/0076812 A1* | 4/2003 | Benedittis | 370/350 |
| 2009/0046570 A1* | 2/2009 | Sarkar et al. | 370/203 |
| 2009/0046800 A1* | 2/2009 | Xu et al. | 375/267 |
| 2009/0122731 A1* | 5/2009 | Montojo et al. | 370/280 |
| 2009/0238241 A1* | 9/2009 | Hooli et al. | 375/133 |

FOREIGN PATENT DOCUMENTS

| | | |
|---|---|---|
| CN | 101252386 A | 8/2008 |
| CN | 101252774 A | 8/2008 |
| CN | 101378595 A | 3/2009 |
| EP | 1212853 B1 | 8/2005 |

OTHER PUBLICATIONS

International Search Report dated Oct. 29, 2009.
ZTE Corporation, "Time & Frequency Location Mapping for TDD PRACH", May 9, 2008, pp. 1-8.
ZTE Corporation et al., "Configurations and location Mapping for TDD PRACH", Mar. 31-Apr. 4, 2008, pp. 1-11.

* cited by examiner

*Primary Examiner* — Brian D Nguyen
*Assistant Examiner* — Toan Nguyen
(74) *Attorney, Agent, or Firm* — Banner & Witcoff, Ltd.

(57) ABSTRACT

The present invention provides a method for determining the number of random access channels which is applied to a time division duplex system. The method comprises: a terminal determining configuration parameters related to the number of the random access channels in an UpPTS based on system configuration, said configuration parameters including the number of downlink-to-uplink switch-points in one radio frame $N_{SP}$, the density of PRACHs in a random access configuration $D_{RA}$, a system frame number of a system frame in which said UpPTS is located $n_f$, and a version index corresponding to a PRACH configuration index $r_{RA}$; and said terminal then calculating directly the number of the PRACHs in said UpPTS based on the configuration parameters. The present invention also provides a method for sending a SRS of a time division duplex system using the method for determining the number of the random access channels.

13 Claims, 3 Drawing Sheets

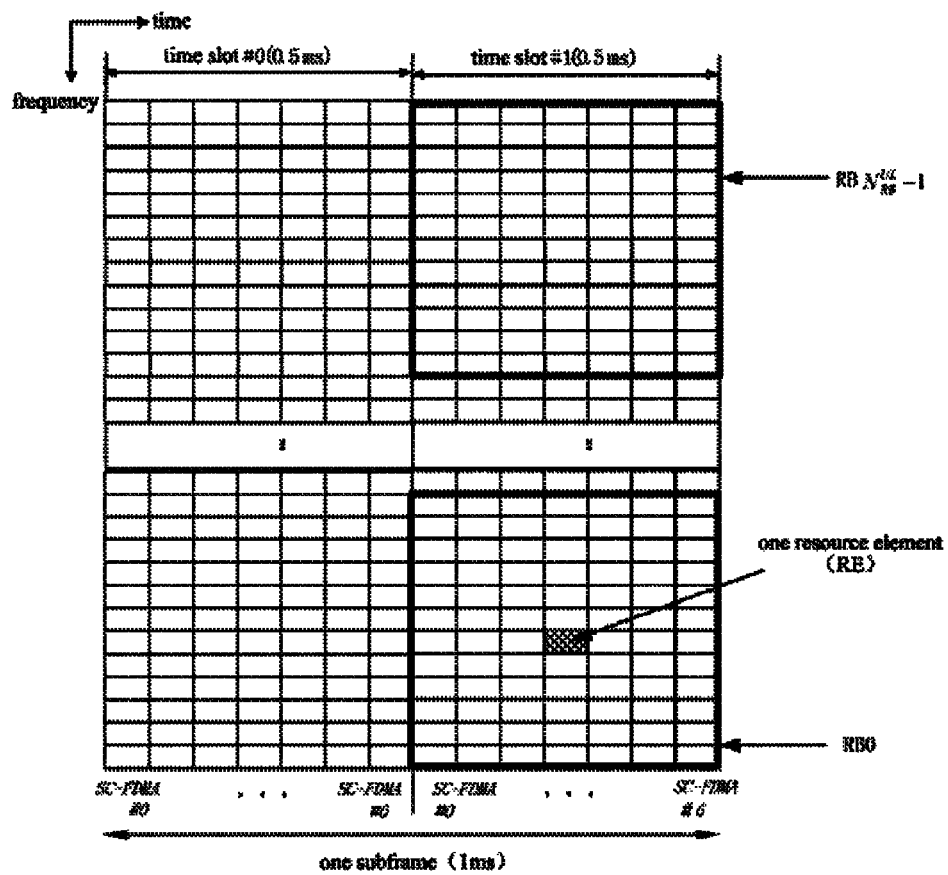
FIG. 2 (Prior Art)
FIG. 3 (Prior Art)
FIG. 4 (Prior Art)

METHOD FOR DETERMINING RANDOM ACCESS CHANNEL NUMBER AND SENDING SOUNDING REFERENCE SIGNAL

TECHNICAL FIELD

The present invention relates to communication field, and more particularly, to a method for determining the number of random access channels and a method for sending a sounding reference signal.

TECHNICAL BACKGROUND

FIG. 1 illustrates a schematic diagram of a frame structure in a TDD (Time Division Duplex) mode of a LTE system, which is also called frame structure type 2. In this type of frame structure, a radio frame of 10 ms (307200 Ts, 1 ms=30720 Ts) is divided into two half-frames, each having a length of 5 ms (153600 Ts) and containing 5 subframes with the length of 1 ms. The role of each of the subframes is shown in Table 1, where D represents a downlink subframe used for transmitting downlink signals, and U represents an uplink subframe (which is called generic uplink subframe) used for transmitting uplink signals. Furthermore, an uplink/downlink subframe is divided into 2 time slots of 0.5 ms, and S represents a special subframe which contains three special time slots, a DwPTS (Downlink Pilot Time Slot), a GP (Guard Period) and an UpPTS (Uplink Pilot Time Slot). In an actual system, indices of uplink/downlink configuration will be notified to a UE (User Equipment) through a broadcast message.

TABLE 1

| | | uplink/downlink configuration | | | | | | | | | |
|---|---|---|---|---|---|---|---|---|---|---|---|
| Configuration Configuration index number | Switch-point periodicity Switch-point periodicity | | | | Subframe number | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Resource allocation in the LTE system takes a PRB (Physical Resource Block, or Resource Block (RB) for short) as a unit, and one PRB occupies 12 subcarriers (which are also called Resource Elements (RE), each subcarrier being 15 kHz) in frequency domain and occupies one time slot in time domain, that is, it is a SC-FDMA symbol occupying 7 normal cyclic prefixes (Normal CP) or 6 extended cyclic prefix (Extended CP) in time domain. If the total number of RBs corresponding to uplink system bandwidth in frequency domain is $N_{RB}^{UL}$, then indices of the RBs are 0, 1, ..., $N_{RB}^{UL}-1$, and indices of REs are 0, 1, ..., $N_{RB}^{UL} \cdot N_{SC}^{RB}-1$, where $N_{SC}^{RB}$ is the number of subcarriers corresponding to one RB in frequency domain. Taking the normal cyclic prefixes as an example, the structure of the PRB is shown in FIG. 2.

A physical random access channel (PRACH) may also be called a random access opportunity or random access resource, and one random access channel corresponds to one random access preamble, which consists of two portions, a cyclic prefix (CP) and a sequence, as shown in FIG. 3. Different random access preamble formats mean different CP and/or sequence lengths. Currently, types of the preamble formats that are supported by the TDD mode in the LTE system are shown in FIG. 2.

TABLE 2

| Preamble Format | $T_{CP}$ | $T_{SEQ}$ |
|---|---|---|
| 0 | $3168 \cdot T_S$ | $24576 \cdot T_S$ |
| 1 | $21024 \cdot T_S$ | $24576 \cdot T_S$ |
| 2 | $6240 \cdot T_S$ | $2 \cdot 24576 \cdot T_S$ |
| 3 | $21024 \cdot T_S$ | $2 \cdot 24576 \cdot T_S$ |
| 4 | $448 \cdot T_S$ | $4096 \cdot T_S$ |

(only for frame structure type 2)

In the random access preamble formats shown in FIG. 2, preamble formats 0~3 are transmitted in the generic uplink subframe, while preamble format 4 is transmitted in the UpPTS. In frequency domain, one random access preamble occupies a bandwidth corresponding to 6 PRBs, that is, 72 REs. PRACHs with the same time domain position are differentiated through the frequency domain.

In the TDD mode of the LTE system, random access configurations are shown in Table 3, where $D_{RA}$ the density of the random access channels, when $D_{RA}>0.5$, it represents the number of PRACHs per radio frame of 10 ms, and when $D_{RA}=0.5$, it means 20 ms, i.e., there is one PRACH per 2 radio frames; $r_{RA}$ is a version number corresponding to a PRACH configuration index. A base station informs a terminal of a PRACH configuration index number such that the terminal can obtain a parameter corresponding to the index number.

TABLE 3

| PRACH conf. Index | Preamble Format | Density Per 10 ms ($D_{RA}$) | Version ($r_{RA}$) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |

TABLE 3-continued

| PRACH conf. Index | Preamble Format | Density Per 10 ms ($D_{RA}$) | Version ($r_{RA}$) |
|---|---|---|---|
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |

A sounding reference signal (SRS) is used for measuring uplink channel quality. Subcarriers of the SRS in the same SRS frequency band are positioned at intervals, as shown in FIG. 4. Such a comb-like structure allows more users to send the SRS in the same SRS bandwidth. The bandwidth of the SRS is configured using a tree-like structure, that is, each SRS bandwidth configuration corresponds to one tree-like structure, wherein SRS bandwidth in the top layer corresponds to the maximum bandwidth of this SRS bandwidth configuration. Table 4~Table 7 show SRS bandwidth configurations in different uplink system bandwidth ranges respectively.

Take SRS bandwidth configuration 1 in Table 4 as an example, b=0 is the first layer, the top layer of the tree-like structure, the SRS bandwidth of which is a bandwidth corresponding to 32 PRBs and is the maximum SRS bandwidth of this SRS bandwidth configuration; b=1 is the second layer, the SRS bandwidth of which is a bandwidth corresponding to 16 PRBs, and one SRS bandwidth of the previous layer is divided into 2 SRS bandwidths ($N_b=2$) in the second layer; b=2 is the third layer, the SRS bandwidth of which is a bandwidth corresponding to 8 PRBs, and one SRS bandwidth of the previous layer is divided into 2 SRS bandwidths of the third layer; and b=3 is the fourth layer, the SRS bandwidth of which is a bandwidth corresponding to 4 PRBs, and one SRS bandwidth of the previous layer is divided into 2 SRS bandwidths of the fourth layer.

TABLE 4

$(6 \leq N_{RB}^{UL} \leq 40)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 5

$(40 \leq N_{RB}^{UL} \leq 60)$

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |

TABLE 5-continued ($40 \leq N_{RB}^{UL} \leq 60$)

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 6

($60 \leq N_{RB}^{UL} \leq 80$)

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 7

($80 \leq N_{RB}^{UL} \leq 110$)

| SRS bandwidth configuration | SRS-Bandwidth b = 0 | | SRS-Bandwidth b = 1 | | SRS-Bandwidth b = 2 | | SRS-Bandwidth b = 3 | |
|---|---|---|---|---|---|---|---|---|
| | $m_{SRS,b}$ | $N_b$ | $m_{SRS,b}$ | $N_b$ | $m_{SRS,b}$ | $N_b$ | $m_{SRS,b}$ | $N_b$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

A SRS may be transmitted in the UpPTS, and then the first carrier in a frequency band range of the SRS is determined according to the following formula.

$$k_0' = \begin{cases} (N_{RB}^{UL} - m_{SRS,0})N_{sc}^{RB} + k_{TC} & \text{if } ((n_f \bmod 2) \times (2 - N_{SP}) + t_{RA}^1) \bmod 2 = 0 \\ k_{TC} & \text{otherwise} \end{cases}$$

where $N_{RB}^{UL}$ is the number of RBs corresponding to the uplink system bandwidth, $m_{SRS,0}$ is the frequency band range of the SRS (maximum SRS bandwidth), $N_{sc}^{RB}$ is the number of subcarriers in one RB, $k_{TC}$ is a start point of the comb-like structure, and $k_{TC} \in \{0,1\}$, $n_f$ is a system frame number (SFN) of a radio frame in which the UpPTS is located, $N_{SP}$ is the number of downlink-to-uplink switch-points in one radio frame, $t_{RA}^1=0$ and $t_{RA}^1=1$ represent the first half-frame and the second half-frame respectively, that is to say, $t_{RA}^1=0$ when the UpPTS is in the first half-frame of the radio frame, and $t_{RA}^1=1$ when UpPTS is in the second half-frame of the radio frame.

Additionally, when the SRS bandwidth is selected such that b=0, the SRS bandwidth may be reconfigured as $$m_{SRS,0} = \max_{c \in C}\{m_{SRS,0}^c\} \leq \{N_{RB}^{UL} - 6N_{RA}\}$$

where c is a SRS bandwidth configuration, C is a set of bandwidth configurations in Table 4~Table 7, $N_{RA}$ is the number of PRACHs contained in the UpPTS in which the SRS is located. That is to say, when b=0, the SRS bandwidth equals to the maximum SRS bandwidth which is less than or equal to $N_{RB}^{UL} - 6N_{RA}$ in a set of all SRS bandwidth configurations (including those in Table 4~Table 7) in all uplink system bandwidth ranges. In another instance, the SRS bandwidth may also be reconfigured as the maximum SRS bandwidth which is less than or equal to $N_{RB}^{UL} - 6N_{RA}$ in a set of all SRS bandwidth configurations (including those in only one table) in the uplink system bandwidth range which contains the current uplink system bandwidth.

When the SRS bandwidth is reconfigured, the number of PRACHs in the UpPTS is required to be known. The conventional method is to combine all PRACH configuration states with all uplink-to-downlink proportion configurations to traverse the number of channels in an UpPTS in each state, and store the resulting result into a table. This method needs to store such a table in both the base station and the terminal, thus system overhead is very large.

SUMMARY OF THE INVENTION

A problem to be solved by the present invention is to provide a method for determining the number of random access channels such that the number of PRACHs in an UpPTS can be calculated conveniently, thereby reducing system memory overhead.

In order to solve the technical problem described above, the present invention provides a method for determining the number of random access channels comprising:

a terminal determining configuration parameters related to the number of the random access channels in an uplink pilot time slot (UpPTS) based on system configuration, the configuration parameters including the number of downlink-to-uplink switch-points in one radio frame, $N_{SP}$, the density of physical random access channels (PRACH) in a random access configuration, $D_{RA}$, a system frame number of a system frame in which said UpPTS is located, $n_f$, and a version index corresponding to a PRACH configuration index, $r_{RA}$; and said terminal then calculating directly the number of the PRACHs in said UpPTS based on the configuration parameters.

Further, the method also has the following feature: when $D_{RA} > 0.5$, the terminal determines the number of the PRACHs in said UpPTS according to the following formula:

$$N_{RA} = \left\lfloor \frac{D_{RA}}{N_{SP}} \right\rfloor + \alpha \cdot \beta \cdot (r_{RA} + 1 - t_{RA}^1) \bmod 2$$

where $\alpha = D_{RA} \bmod 2$; $\beta = (N_{SP} - 1) \bmod 2$; and $t_{RA}^1 = 0$ when said UpPTS is located in the first half-frame of the radio frame, and $t_{RA}^1 = 1$ when in the second half-frame of the radio frame, "$\lfloor \ \rfloor$" means rounding down to the nearest integer, and mod is a modulo operation.

Further, the method also has the following feature: when $D_{RA} = 0.5$, the terminal determines the number of the PRACHs in said UpPTS according to the following formula:

$$N_{RA} = \left[(n_f + 1 + r_{RA})\left(\left\lfloor \frac{r_{RA}}{2} \right\rfloor + 1 - t_{RA}^1\right)\right] \bmod 2, \text{ or}$$

$$N_{RA} = \left[(n_f + 1 + r_{RA})\left(\left\lfloor \frac{r_{RA}}{2} \right\rfloor + 1 + t_{RA}^1\right)\right] \bmod 2$$

where $t_{RA}^1 = 0$ when said UpPTS is located in the first half-frame of the radio frame, and $t_{RA}^1 = 1$ when in the second half-frame of the radio frame, "$\lfloor \ \rfloor$" means rounding down to the nearest integer, and mod is a modulo operation.

Further, the method also has the following feature: the method is applied to a time division duplex system of a long time evolution (LTE) system.

Using the above-described method allows memory overhead required for determining the number of the random access channels to be reduced, further reducing cost of devices.

Another problem to be solved by the present invention is to provide a method for sending an uplink channel sounding reference signal (SRS) of a time division duplex system such that system resources required for sending the SRS can be reduced.

In order to solve the technical problem described above, the present invention provides a method for sending an uplink channel sounding reference signal (SRS) of a time division duplex system comprising:

a terminal determining parameters of resources used for sending the SRS in an uplink pilot time slot (UpPTS) based on configuration information related to the uplink channel sounding reference signal (SRS), said parameters including SRS bandwidth and the number of layers in a tree-like structure corresponding to the SRS bandwidth, b, and then sending said SRS over the resources;

wherein when b=0 and the SRS bandwidth is reconfigured by said terminal, the number of physical random access channels (PRACH) in said UpPTS is calculated based on the number of downlink-to-uplink switch-points in one radio frame, the density of the PRACHs in a random access configuration, a system frame number of a system frame in which said UpPTS is located and a version index corresponding to a PRACH configuration index.

Further, the method also has the following feature: when $D_{RA} > 0.5$, the terminal determines the number of the PRACHs in said UpPTS according to the following formula:

$$N_{RA} = \left\lfloor \frac{D_{RA}}{N_{SP}} \right\rfloor + \alpha \cdot \beta \cdot (r_{RA} + 1 - t_{RA}^1) \bmod 2$$

where $\alpha = D_{RA} \bmod 2$; $\beta = (N_{SP} - 1) \bmod 2$; $t_{RA}^1 = 0$ when said UpPTS is located in the first half-frame of the radio frame, and $t_{RA}^1 = 1$ when in the second half-frame of the radio frame, $N_{SP}$ is the number of the downlink-to-uplink switch-points in one radio frame, $D_{RA}$ the density of the PRACHs in the random access configuration, "$\lfloor \ \rfloor$" means rounding down to the nearest integer, and mod is a modulo operation.

Further, the method also has the following feature: when $D_{RA} = 0.5$, the terminal determines the number of the PRACHs in said UpPTS according to the following formula:

$$N_{RA} = \left[(n_f + 1 + r_{RA})\left(\left\lfloor \frac{r_{RA}}{2} \right\rfloor + 1 - t_{RA}^1\right)\right] \bmod 2, \text{ or}$$

$$N_{RA} = \left[(n_f + 1 + r_{RA})\left(\left\lfloor \frac{r_{RA}}{2} \right\rfloor + 1 + t_{RA}^1\right)\right] \bmod 2$$

where $t_{RA}^1 = 0$ when said UpPTS is located in the first half-frame of the radio frame, and $t_{RA}^1 = 1$ when in the second half-frame of the radio frame, $n_f$ is a system frame number of a system frame in which said UpPTS is located, $r_{RA}$ the version index corresponding to the PRACH configuration index, "$\lfloor \ \rfloor$" means rounding down to the nearest integer, and mod is a modulo operation.

Further, the method also has the following feature:

When the SRS bandwidth is reconfigured by said terminal, the SRS bandwidth is reconfigured as the maximum SRS bandwidth which is less than or equal to $N_{RB}^{UL} - 6N_{RA}$ in a set of all SRS bandwidth configurations in all uplink system bandwidth ranges, where $N_{RA}$ is the number of the PRACHs in said UpPTS, $N_{RB}^{UL}$ is the total number of physical resource blocks corresponding to uplink system bandwidths in frequency domain.

Further, the method also has the following feature:

When the SRS bandwidth is reconfigured by said terminal, the SRS bandwidth is reconfigured as the maximum SRS bandwidth which is less than or equal to $N_{RB}{}^{UL}-6N_{RA}$ in a set of all SRS bandwidth configurations in an uplink system bandwidth range in which the current uplink system bandwidth is located, where $N_{RA}$ is the number of the PRACHs in said UpPTS, $N_{RB}{}^{UL}$ is the total number of physical resource blocks corresponding to uplink system bandwidths in frequency domain.

Further, the method also has the following feature: the method is applied to a time division duplex system of a long time evolution (LTE) system.

Using the above-described method allows the number of the PRACHs in the UpPTS in which the SRS is located to be calculated accurately when the SRS bandwidth is reconfigured during the sending of the SRS, and only few system resources are required to be occupied.

BRIEF DESCRIPTION OF DRAWINGS

The drawings illustrated herein which form a part of the application are used for providing the further understanding of the present invention, and the exemplary embodiments of the invention and their descriptions are intended to explain the invention and not limit the invention. In the drawings:

FIG. 2 is a schematic diagram of a structure of a physical resource block in the system of FIG. 1;

FIG. 3 is a structure diagram of a random access preamble;

FIG. 4 is a schematic diagram of a SRS comb-like structure; and

PREFERRED EMBODIMENTS OF THE INVENTION

Specific embodiments of the present invention will be described in detail below by taking a TDD mode of a LTE system as an example.

When a SRS is sent by a terminal (which is called a user equipment in the LTE system), parameters of resources for sending the SRS in an UpPTS are required to be calculated based on configuration information related to the SRS, afterward, said SRS is sent over the resources.

The configuration information related to the SRS comprises a SRS bandwidth configuration parameter which is broadcast in a cell, such as a SRS bandwidth configuration index number as shown in Table 4~Table 7. The terminal may determines a tree-like structure of SRS bandwidth and $M_{SRS,b}$ and $N_b$ in each branch corresponding to the tree-like structure based on uplink system bandwidth and the parameter; and a base station is required to allocate resources for the SRS in the UpUTS and send the terminal configuration information of the resources, such as the configured number of layers, b, in the tree-like structure corresponding to the SRS bandwidth, when receiving the SRS from the terminal to measure uplink channels. The terminal may calculate the parameters of the resources for sending the SRS, including time domain, frequency domain and the parameters related to the used sequences, after receiving the configuration information associated with the SRS.

What this embodiment concerns is how to determine $N_{RA}$ when b=0 and the SRS bandwidth is required to be reconfigured as the maximum SRS bandwidth which is less than or equal to $N_{RB}{}^{UL}-6N_{RA}$ in a set of all SRS bandwidth configurations (including those in Table 4~Table 7) in all uplink system bandwidth ranges.

Figure 5:
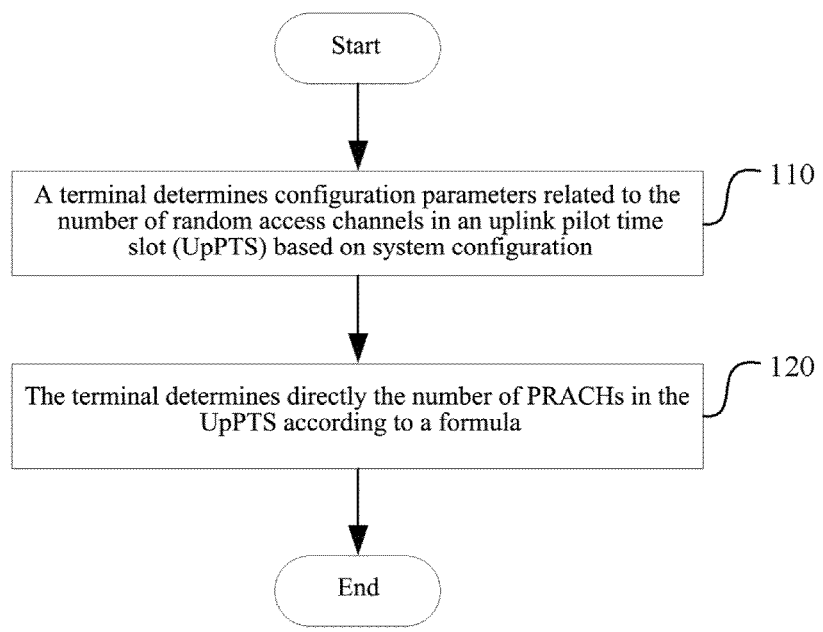
FIG. 5 is a flow chart of a method in accordance with an embodiment of the present invention.

As shown in FIG. 5, a method for determining the number of random access channels in accordance with this embodiment comprises the following steps:

Step 110, a terminal determines, based on system configuration, configuration parameters related to the number of the random access channels in an uplink pilot time slot (UpPTS), including the number of downlink-to-uplink switch-points in one radio frame, $N_{SP}$, the density of physical random access channels (PRACH), $D_{RA}$, a system frame number of a system frame in which said UpPTS is located, $n_f$, and a version index corresponding to a PRACH configuration index, $r_{RA}$.

Step 120, the terminal determines directly the number of the PRACHs in said UpPTS according to the following formula:

$$N_{RA} = \begin{cases} \left\lfloor \frac{D_{RA}}{N_{SP}} \right\rfloor + \alpha \cdot \beta \cdot (r_{RA} + 1 - t_{RA}^1) \bmod 2 & \text{when } D_{RA} > 0.5 \\ \left[ (n_f + 1 + r_{RA})\left(\left\lfloor \frac{r_{RA}}{2} \right\rfloor + 1 - t_{RA}^1\right) \right] \bmod 2 & \text{when } D_{RA} = 0.5 \end{cases}$$

where $\alpha = D_{RA} \bmod 2$; $\beta = (N_{SP}-1) \bmod 2$; $N_{SP}$ (which may be obtained based on uplink-to-downlink proportion configuration) is the number of the downlink-to-uplink switch-points in one radio frame, $D_{RA}$ is the density of the PRACHs in a random access configuration, $D_{RA}$ the number of the PRACHs per radio frame of 10 ms when it is greater than or is equal to 1, and when $D_{RA}=0.5$, it means 20 ms, i.e., there is one PRACH per 2 radio frames; and $r_{RA}$ a version number, i.e. a version index, corresponding to a PRACH configuration index; $t_{RA}^1=0$ when the UpPTS is in the first half-frame of the radio frame, and $t_{RA}^1=1$ when the UpPTS is in the first half-frame of the radio frame. $n_f$ is a system frame number (SFN) of a system frame in which the UpPTS is located, "⌊ ⌋" means rounding down to the nearest integer, and mod is a modulo operation.

when $D_{RA}=0.5$, the terminal determines the number of the PRACHs in said UpPTS accordance to the following formula with the resulting result being the same:

$$N_{RA} = \left[ (n_f + 1 + r_{RA})\left(\left\lfloor \frac{r_{RA}}{2} \right\rfloor + 1 + t_{RA}^1\right) \right] \bmod 2$$

In this embodiment, $D_{RA}$ and $r_{RA}$ may be obtained by the terminal by searching a random access configuration table based on PRACH configuration index numbers configured by the system, and $N_{SP}$ may be obtained by the terminal by searching an uplink-to-downlink proportion configuration table based on uplink-to-downlink proportion configuration indices of the system. However, the present invention does not need to limit the way of obtaining these parameters, a table can be given separately in the protocol to establish the corresponding relation between the uplink-to-downlink proportion configuration index and $N_{SP}$, for example.

All PRACH configuration states are combined with all uplink-to-downlink proportion configurations to traverse the number of channels in an UpPTS in each state, and the resulting result is compared with the result calculated from the above formula, in order to verify the correctness of the above formula. This method does not need to store the result of each combination in the terminal, therefore the corresponding memory resources are not required to be occupied.

When b=0 and the SRS bandwidth is required to be reconfigured as the maximum SRS bandwidth which is less than or equal to $N_{RB}^{UL}-6N_{RA}$ in a set of all SRS bandwidth configurations (including all SRS bandwidth configurations in one table) in an uplink system bandwidth range which contains the current uplink system bandwidth, $N_{RA}$ thereof may also be determined according to the above formula. Substantial memory overhead may also be saved.

Two application examples will be described below.

Example 1

Figure 1:
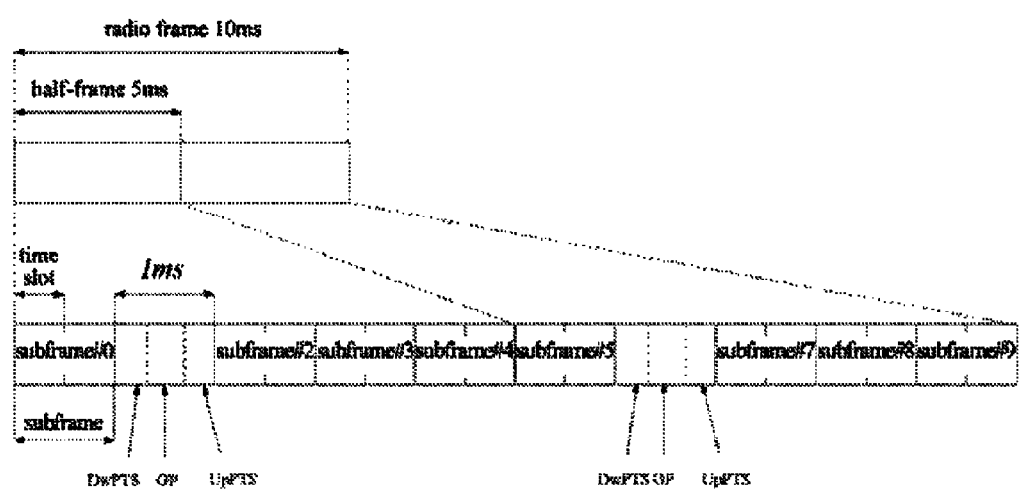
FIG. 1 is a schematic diagram of a frame structure in a TDD mode of a LTE system.

Assuming that the configured PRACH configuration index is 48 and uplink-to-downlink proportion configuration is 0, then $N_{SP}=2$, as shown in FIG. 1, and $D_{RA}=0.5$ and $r_{RA}=0$, as shown in FIG. 3. Therefore, it can be seen from the present invention that there is one PRACH in an UpPTS in the first half-frame of a radio frame with a even system number, i.e., $N_{RA}=1$, and there is no PRACH in other UpPTSs, i.e., $N_{RA}=0$.

Example 2

Assuming that the configured PRACH configuration index is 56 and uplink-to-downlink proportion configuration is 0, then $N_{SP}=2$, as shown in FIG. 1, and $D_{RA}=5$ and $r_{RA}=0$, as shown in FIG. 3. Therefore, it can be seen from the present invention that there are 3 PRACHs in an UpPTS in the first half-frame of each radio frame, i.e., $N_{RA}=3$, and there are 2 PRACHs in the UpPTS in the second half-frame of each radio frame, i.e., $N_{RA}=2$.

The above description is merely the preferred embodiments of the present invention and is not intended to limit the invention. Various modifications and variations may be made by those skilled in the art. Any modification, equivalent substitution or improvement within the spirit and principle of the invention should be included in the scope of the appended claims of the invention.

INDUSTRIAL APPLICABILITY

Using the above-described method allows memory overhead required for determining the number of the random access channels to be reduced, further reducing cost of devices.

What we claim is:

1. A method for determining a quantity of physical random access channels (PRACHs) comprising:
a terminal determining configuration parameters related to the quantity of the random access channels in an uplink pilot time slot (UpPTS) based on system configuration, said configuration parameters including a quantity of downlink-to-uplink switch-points in one radio frame, $N_{SP}$, the density of PRACHs in a random access configuration, $D_{RA}$, a system frame number of a system frame in which said UpPTS is located, $n_f$, and a version index corresponding to a PRACH configuration index, $r_{RA}$; and
said terminal then calculating directly the quantity of the PRACHs in said UpPTS based on the configuration parameters;
wherein when $D_{RA}>0.5$, the terminal determines the quantity of the PRACHs in said UpPTS according to the following formula:

$$N_{RA} = \left\lfloor \frac{D_{RA}}{N_{SP}} \right\rfloor + \alpha \cdot \beta \cdot (r_{RA} + 1 - t_{RA}^1) \bmod 2$$

where $\alpha = D_{RA} \bmod 2$; $\beta = (N_{SP}-1) \bmod 2$; and $t_{RA}^1=0$ when said UpPTS is located in the first half-frame of the radio frame, and $t_{RA}^1=1$ when in the second half-frame of the radio frame, "$\lfloor \ \rfloor$" means rounding down to the nearest integer, and mod is a modulo operation.

2. The method according to claim 1, wherein when $D_{RA}=0.5$, the terminal determines the quantity of the PRACHs in said UpPTS according to the following formula:

$$N_{RA} = \left[(n_f + 1 + r_{RA})\left(\left\lfloor \frac{r_{RA}}{2} \right\rfloor + 1 - t_{RA}^1\right)\right] \bmod 2, \text{ or}$$

$$N_{RA} = \left[(n_f + 1 + r_{RA})\left(\left\lfloor \frac{r_{RA}}{2} \right\rfloor + 1 + t_{RA}^1\right)\right] \bmod 2$$

where $t_{RA}^1=0$ when said UpPTS is located in the first half-frame of the radio frame, and $t_{RA}^1=1$ when in the second half-frame of the radio frame, "$\lfloor \ \rfloor$" means rounding down to the nearest integer, and mod is a modulo operation.

3. The method according to claim 1, being applied to a time division duplex system of a long time evolution (LTE) system.

4. A method for determining a quantity of physical random access channels (PRACHs) comprising:
a terminal determining configuration parameters related to the quantity of PRACHs in an uplink pilot time slot (UpPTS) based on system configuration, said configuration parameters including a quantity of downlink-to-uplink switch-points in one radio frame, $N_{SP}$, the density of PRACHs in a random access configuration, $D_{RA}$, a system frame number of a system frame in which said UpPTS is located, $n_f$, and a version index corresponding to a PRACH configuration index, $r_{RA}$; and
said terminal then calculating directly the quantity of the PRACHs in said UpPTS based on the configuration parameters;
wherein when $D_{RA}=0.5$, the terminal determines the quantity of the PRACHs in said UpPTS according to the following formula:

$$N_{RA} = \left[(n_f + 1 + r_{RA})\left(\left\lfloor \frac{r_{RA}}{2} \right\rfloor + 1 - t_{RA}^1\right)\right] \bmod 2, \text{ or}$$

$$N_{RA} = \left[(n_f + 1 + r_{RA})\left(\left\lfloor \frac{r_{RA}}{2} \right\rfloor + 1 + t_{RA}^1\right)\right] \bmod 2$$

where $t_{RA}^1=0$ when said UpPTS is located in the first half-frame of the radio frame, and $t_{RA}^1=1$ when in the second half-frame of the radio frame, "$\lfloor \ \rfloor$" means rounding down to the nearest integer, and mod is a modulo operation.

5. The method according to claim 4, being applied to a time division duplex system of a long time evolution (LTE) system.

6. A method for sending an uplink channel sounding reference signal (SRS) of a time division duplex system comprising:
a terminal determining parameters of resources used for sending the SRS in an uplink pilot time slot (UpPTS) based on configuration information related to the uplink channel sounding reference signal (SRS), said parameters including SRS bandwidth and a layer number in a tree-like structure corresponding to the SRS bandwidth, b, and then sending said SRS over the resources;

wherein when b=0 and the SRS bandwidth is reconfigured by said terminal, a quantity of physical random access channels (PRACHs) in said UpPTS is calculated based on a quantity of downlink-to-uplink switch-points in one radio frame, the density of the PRACHs in a random access configuration, a system frame number of a system frame in which said UpPTS is located and a version index corresponding to a PRACH configuration index.

7. The method according to claim 6, wherein when $D_{RA} > 0.5$, the terminal determines the quantity of the PRACHs in said UpPTS according to the following formula:

$$N_{RA} = \left\lfloor \frac{D_{RA}}{N_{SP}} \right\rfloor + \alpha \cdot \beta \cdot (r_{RA} + 1 - t_{RA}^1) \bmod 2$$

where $\alpha = D_{RA} \bmod 2$; $\beta = (N_{SP}-1) \bmod 2$; $t_{RA}^1 = 0$ when said UpPTS is located in the first half-frame of the radio frame, and $t_{RA}^1 = 1$ when in the second half-frame of the radio frame, $N_{SP}$ is the quantity of the downlink-to-uplink switch-points in one radio frame, $D_{RA}$ is the density of the PRACHs in the random access configuration, "$\lfloor \ \rfloor$" means rounding down to the nearest integer, and mod is a modulo operation.

8. The method according to claim 6, wherein:
when the SRS bandwidth is reconfigured by said terminal, the SRS bandwidth is reconfigured as the maximum SRS bandwidth which is less than or equal to $N_{RB}^{UL} - 6N_{RA}$ in a set of all SRS bandwidth configurations in all uplink system bandwidth ranges, where $N_{RA}$ is the quantity of the PRACHs in said UpPTS, $N_{RB}^{UL}$ is the total quantity of physical resource blocks corresponding to uplink system bandwidths in frequency domain.

9. The method according to claim 7, wherein:
when the SRS bandwidth is reconfigured by said terminal, the SRS bandwidth is reconfigured as the maximum SRS bandwidth which is less than or equal to $N_{RB}^{UL} - 6N_{RA}$ in a set of all SRS bandwidth configurations in an uplink system bandwidth range in which the current uplink system bandwidth is located, where $N_{RA}$ is the quantity of the PRACHs in said UpPTS, $N_{RB}^{UL}$ is the total quantity of physical resource blocks corresponding to uplink system bandwidths in frequency domain.

10. The method according to claim 6, wherein when $D_{RA} = 0.5$, the terminal determines the quantity of the PRACHs in said UpPTS according to the following formula:

$$N_{RA} = \left[(n_f + 1 + r_{RA})\left(\left\lfloor \frac{r_{RA}}{2} \right\rfloor + 1 - t_{RA}^1\right)\right] \bmod 2, \text{ or}$$

$$N_{RA} = \left[(n_f + 1 + r_{RA})\left(\left\lfloor \frac{r_{RA}}{2} \right\rfloor + 1 + t_{RA}^1\right)\right] \bmod 2$$

where $t_{RA}^1 = 0$ when said UpPTS is located in the first half-frame of the radio frame, and $t_{RA}^1 = 1$ when in the second half-frame of the radio frame, $n_f$ is a system frame number of a system frame in which said UpPTS is located, $r_{RA}$ is the version index corresponding to the PRACH configuration index, "$\lfloor \ \rfloor$" means rounding down to the nearest integer, and mod is a modulo operation.

11. The method according to claim 10, wherein:
when the SRS bandwidth is reconfigured by said terminal, the SRS bandwidth is reconfigured as the maximum SRS bandwidth which is less than or equal to $N_{RB}^{UL} - 6N$ in a set of all SRS bandwidth configurations in all uplink system bandwidth ranges, where $N_{RA}$ is the quantity of the PRACHs in said UpPTS, $N_{RB}^{UL}$ is the total quantity of physical resource blocks corresponding to uplink system bandwidths in frequency domain.

12. The method according to claim 10, wherein:
when the SRS bandwidth is reconfigured by said terminal, the SRS bandwidth is reconfigured as the maximum SRS bandwidth which is less than or equal to $N_{RB}^{UL} - 6N$ in a set of all SRS bandwidth configurations in an uplink system bandwidth range in which the current uplink system bandwidth is located, where $N_{RA}$ is the quantity of the PRACHs in said UpPTS, $N_{RB}^{UL}$ is the total quantity of physical resource blocks corresponding to uplink system bandwidths in frequency domain.

13. The method according to claim 6, being applied to a time division duplex system of a long time evolution (LTE) system.

* * * * *